United States Patent
Lu et al.

(10) Patent No.: US 8,453,562 B2
(45) Date of Patent: Jun. 4, 2013

(54) APPARATUS FOR INFANT FORMULA AND BEVERAGE PREPARATION

(76) Inventors: Zhenyu Lu, Boise, ID (US); Jingfeng Yuan, Boise, ID (US)

( * ) Notice: Subject to any disclaimer, the term of this patent is extended or adjusted under 35 U.S.C. 154(b) by 582 days.

(21) Appl. No.: 12/714,363

(22) Filed: Feb. 26, 2010

(65) Prior Publication Data
US 2011/0209624 A1  Sep. 1, 2011

(51) Int. Cl.
*A47J 31/44* (2006.01)
(52) U.S. Cl.
USPC ............ 99/289 R; 99/323.3; 99/287; 99/290; 99/279; 99/300
(58) Field of Classification Search
USPC .................... 99/323.3, 289 R, 287, 290, 275, 99/279, 300
See application file for complete search history.

(56) References Cited

U.S. PATENT DOCUMENTS

| | | | |
|---|---|---|---|
| 6,711,990 B1 * | 3/2004 | Harrison | 99/348 |
| 7,316,249 B2 * | 1/2008 | Cheong | 141/100 |
| 8,210,099 B2 * | 7/2012 | Kang | 99/323.3 |
| 2009/0183637 A1 * | 7/2009 | Nijboer et al. | 99/275 |
| 2009/0188394 A1 * | 7/2009 | Sinnema et al. | 99/287 |
| 2010/0018606 A1 * | 1/2010 | Yacou | 141/311 R |

* cited by examiner

*Primary Examiner* — Benjamin Layno

(57) ABSTRACT

An apparatus for quickly preparing infant formula and beverage comprising: a powder container for storing dry formula or beverage powder, a powder dispenser for dispensing controllable amount of formula or beverage powder into a milk bottle or a cup, a water container for storing water, a heat-exchanging reservoir for heating up or cooling down water to an ideal temperature, a water delivery system for delivering controllable amount of water from the water container to the heat-exchanging reservoir and then from the heat-exchanging reservoir to the milk bottle once the water is adjusted to the ideal temperature. The device has a main setting and controlling system to set up parameters of powder dispensing amount, water dispensing temperature and water dispensing volume prior to a formula or beverage preparation, so that the apparatus can prepare infant formula or beverage with ideal volume, concentration and temperature. The apparatus in present invention can also include an external mixing system which apply shaking or vibration (can be ultrasonic) to the bottle or cup for mixing and dissolving powder with water inside it and a remote controlling system so that a user can start the formula or beverage preparation process from a distance.

17 Claims, 5 Drawing Sheets a)

b)

APPARATUS FOR INFANT FORMULA AND BEVERAGE PREPARATION

FIELD OF THE INVENTION

The present invention relates to an apparatus for preparing infant formula or beverage and, more particularly, to an apparatus that is able to quickly dispense predetermined amount of water with ideal temperature and mix with certain amount of milk powder or other beverage powder.

BACKGROUND OF THE INVENTION

Preparation of infant formula usually involves the following steps manually:
1) Prepare warm water with proper temperature.
2) Pour ideal amount of warm water into a milk bottle.
3) Scoop required amount of formula powder corresponding to the volume of water in the milk bottle and place it into the bottle.
4) Mix the formula powder with the warm water, usually by shaking the milk bottle.

The volume of water and the amount of formula powder need to be substantially accurate, so that the concentration of the prepared formula is optimum. A concentration lower or higher than optimum will affect a baby's nutritional absorption and is bad for the baby's health. The temperature of water also needs to be controlled so that the formula is comfortable for a baby to drink. More importantly, the preparation process often needs to be completed as quickly as possible, especially at night when a baby wakes up in hunger. If the preparation is fast enough, the baby does not get too agitated by hunger and can go back to sleep easier. Failure to prepare formula in a quick manner may make the baby more awake crying in hunger and harder returning to sleep. This will also give a hard time for the caregiver and result in less sleep. Scooping formula powder and the final step of mixing water and powder by shaking milk bottle are not very difficult or time consuming. The most challenging part is obtaining certain amount of water with ideal temperature, especially at night when the caregiver is quite sleepy and with limited lighting.

Many prior arts try to facilitate the formula preparation process in different aspects to certain extent. Examples are U.S. Pat. No. 2009018839A1 issued to Sinnema et al., U.S. Pat. No. 20050230343A1 issued to Huber et al., U.S. Pat. No. 6,766,106B2 issued to Roberson, U.S. Pat. No. 6,829,431B1 issued to Haven et al., and U.S. Pat. No. 7,316,249B2 issued to Cheong. However, there are still some aspects need to make further improvements and some new concerns introduced by this type of inventions also need to be resolved.

Most prior arts deal with cold and sterilized water. Some of them can efficiently heat up the water to warm and dispense controlled amount of warm water. However, there are still needs of boiling water for sterilization. In this case, water needs to be heated up to about 100 C and cooled down to warm, which will take an undesirable long time if a baby needs formula at that moment. None of the prior arts have good solution in this situation. There are some existing ideas of boiling water long before formula preparation and giving enough time for hot water to cool down, then maintaining a warm temperature by a temperature controlling and heating system. However, the downside is that maintaining warm water by repetitive heating for a long time will easily contaminate the water and grow more bacteria, which defeats the purpose of boiling for sterilization.

Many apparatus in prior arts also comprise a mixing unit for dissolving formula powder with water before putting them into the milk bottle. However, hand mixing method by shaking milk bottle is also fast and easy for most instant dissolving formula. So a mixing unit is only optional. Some designs of mixing units may introduce more moisture into the remaining formula powder and cause agglomerating and bacteria growing problems. Furthermore, these mixing units in prior arts will need cleaning after each formula preparation, which adds more effort for a caregiver.

Similarly, some hot beverage such as hot tea, instant coffee and hot chocolate, etc. are also prepared by mixing beverage powder with hot or warm water. Usually a spoon is used to scoop certain amount of beverage powder then mix with a cup of hot or warm water. However, the concentration and temperature is not well controlled. Sometimes, if hot water is not immediately available, it may need a water heating device which can take a long time and not convenient. Also, not all beverages need hot water for preparation. Some can be quickly dissolved in warm water, if prepared with hot water, one has to wait for some time to cool it down before drinking. Therefore, there are also needs for quick water sterilization, short preparation time and controlling of beverage powder dispense amount, water temperature and water dispense volume. Thus, a device for preparing infant formula can also be used for beverage preparation with some modifications.

There are related prior arts for hot beverage preparation devices such as U.S. Pat. No. 5,063,838 issued to Matuschek and U.S. Pat. No. 6,612,224 B2 issued to Mercier et al. However, there are still aspects need improvements and none of them can be used for both infant formula and beverage preparation.

OBJECT OF THE INVENTION

An object of the invention is to provide an apparatus for quickly prepare both infant formula and beverage with well controlled concentration by dispensing accurate amount of formula or beverage powder and water in to a milk bottle or a cup respectively.

Another object of the invention is to provide an apparatus which can quickly heat up cold sterilized water to a predetermined temperature for formula and beverage preparation.

A further object of the invention is to provide an apparatus which can quickly cool down hot sterilized water to a predetermined temperature for formula and beverage preparation.

An additional object of the invention is to provide an apparatus which can quickly boil cold water for sterilization then quickly cool it down to a predetermined temperature for formula and beverage preparation.

A further object of the invention is to provide remote controlling ability for a user to start the formula and beverage preparation process from a distance to improve time-efficiency.

Still another object of the invention is to provide an apparatus to have a water dispensing system and a formula powder dispensing system isolated from each other so that remaining formula or beverage powder will not get unwanted moisture from the water dispensing system.

A further object of the invention is to provide an apparatus which has an external mixing system for mixing formula powder or beverage powder inside the milk bottle or cup. The mixing system will not require extra cleaning or other maintenance.

SUMMARY OF THE INVENTION

In accordance with the present invention, there is provided an apparatus for quickly preparing infant formula and beverage including: a powder container for storing dry formula or beverage powder, a powder dispenser for dispensing controllable amount of formula or beverage powder into a milk bottle or cup, a water container for storing water, a heat-exchanging reservoir for heating up or cooling down water to an ideal temperature, a water delivery system for delivering controllable amount of water from the water container to the heat-exchanging reservoir and then from the heat-exchanging reservoir to the milk bottle once the water is adjusted to a predetermined temperature. The device also has a main setting and controlling system to make adjustable settings of powder dispensing amount, water dispensing temperature and water dispensing volume for formula preparation. With these parameters set up, the apparatus can dispense predetermined amount of formula or beverage powder and water with predetermined temperature into the milk bottle or cup. The main setting and controlling system may also be programmable with a timer to determine best timing for formula availability, which is a more convenient feature for a user.

The powder dispenser is preferably including a mixing or scraping unit for breaking powder that is agglomerated or sticking to the wall of the container. The dispenser can be either manually or electrically driven to dispense predetermined amount of formula or beverage powder.

In one embodiment, the water container is a thermos with thermal insulation structure to keep hot water temperature for a desirable long time. In another embodiment, the water container also includes a heating unit either inside or at the bottom with a temperature sensor so that it is able to boil water for sterilization.

The heat-exchanging reservoir includes a heating unit, a cooling unit and a temperature sensing and controlling unit. When incoming water is colder than a target temperature, the temperature sensing and controlling unit will start the heating unit to quickly heat up the water to the target temperature. When incoming water is hotter than the target temperature, the temperature sensing and controlling unit will start the cooling unit to quickly cool down the water to the target temperature. If there is a requirement, the heat-exchanging reservoir can also boil incoming water for sterilization and cool it down to the target temperature.

The water delivery system includes a pump and valves for precisely deliver certain amount of water into the heat-exchanging reservoir and from the reservoir to the milk bottle or cup when the water hits the target temperature. In another embodiment, the water delivery system also includes a water level sensing and controlling unit placed in the heat-exchanging reservoir, in this case the pump may be eliminated if water can be delivered by gravity or capillary force.

The apparatus in present invention can also include an external mixing system which either shakes or apply ultrasonic vibration to the bottle or the cup for mixing powder with water inside them. Since the mixing process happens within the bottle or the cup, there is no need for extra cleaning and maintenance.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
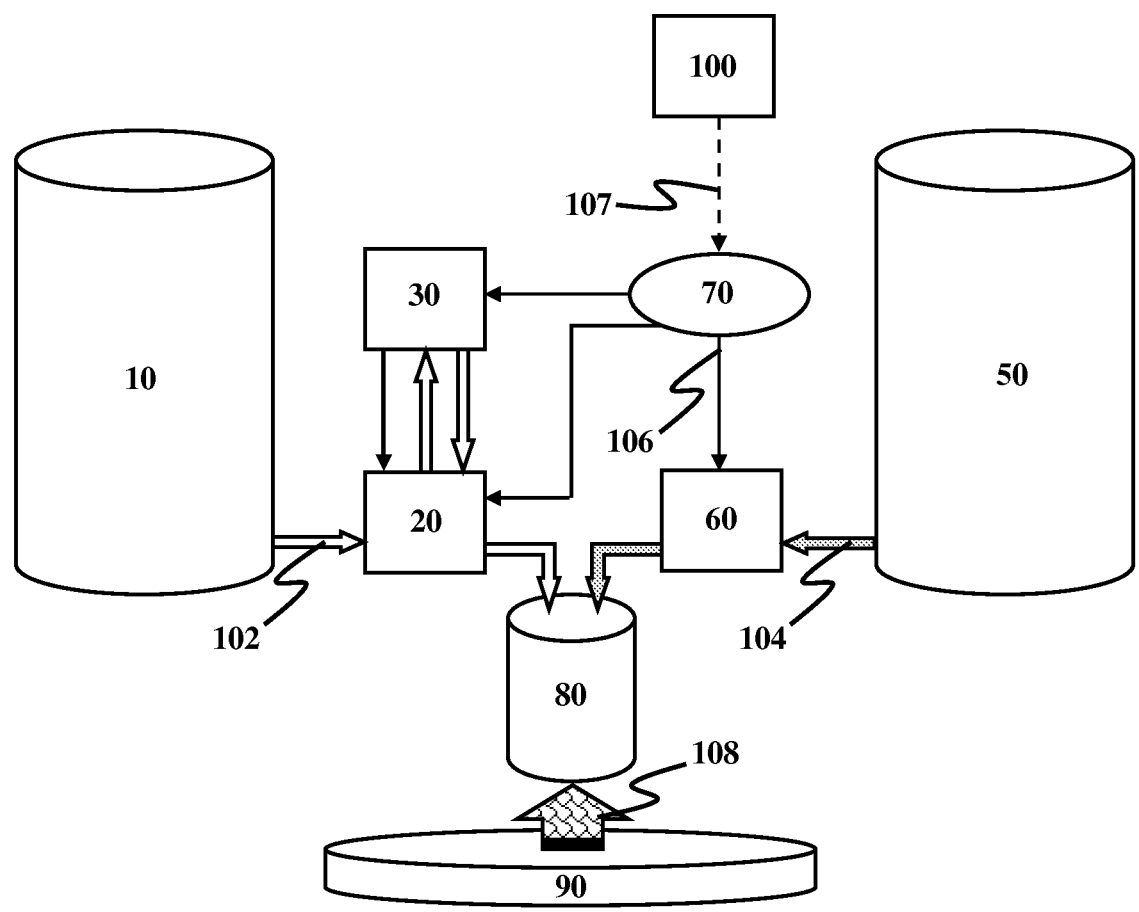
FIG. 1 is a general layout view of an apparatus for infant formula and beverage preparation.

FIG. 1 shows a general layout of the apparatus for infant formula and beverage preparation in this invention with the main functional blocks. A main setting and controlling system 70 predetermines the powder dispensing amount, water dispensing temperature and water dispensing volume and is connected to a water delivery system 20, a heat-exchanging reservoir 30 and a powder dispenser 60. These parameters can be adjusted by a user prior to an operation, so that during the operation, the powder dispenser 60 will dispense predetermined amount of powder from a powder container 50 to a milk bottle or cup 80 and the water delivery system 20 will deliver predetermined amount of water from a water container 10 to the heat-exchanging reservoir 30. The water in the heat-exchanging reservoir 30 will be heated or cooled to the predetermined temperature, and then the water delivery system 20 will deliver the water to the milk bottle or cup 80. To give a better understanding of the general operation, the white block arrows in the figure show water flow 102, the gray block arrows show powder flow 104, and the line arrows show signal control 106. During the operation, if an external mixing system 90 is also presented, it will apply shaking or vibration 108 (can be ultrasonic) to the milk bottle or cup 80 so that the powder and water can be mixed and dissolved faster. The apparatus may further comprise a remote controlling system 100 including a remote controller and a signal receiver connected to the main setting and controlling system 70, so that a user can start the preparation process from a distance though remote signal control 107, with the milk bottle or cup placed properly in advance. This is especially convenient and time-efficient for taking care of a baby at night, when a caregiver is sleepy.

The main setting and controlling system 70 is a combination of all setting and controlling terminals that can be adjusted by a user. The switches for turning power on and off and releasing dispensed water are also viewed as a part of the main setting and controlling system 70 in present invention. It can be integrated into one place as a single controller with multiple parameters or can be located at different places with each place controlling one or more parameters. The main setting and controlling system may also be programmable with a timer to determine the best timing for formula availability, which is a more convenient feature for a user.

Figure 2:
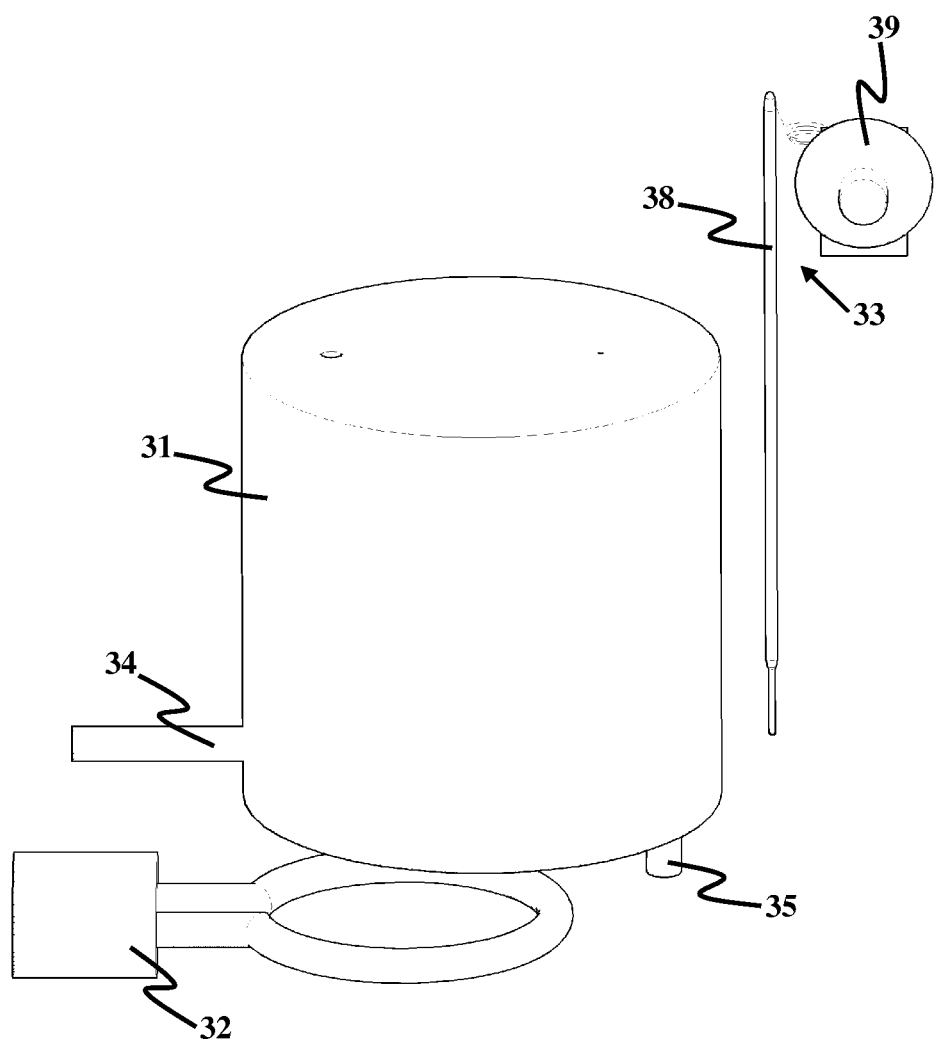
FIG. 2 is an exploded view of a heat-exchanging reservoir for heating up cold sterilized water to a predetermined temperature.

FIG. 2 shows an exploded view of a heat-exchanging reservoir 30 for heating up cold sterilized water to a predetermined temperature in one embodiment. The heat-exchanging reservoir 30 comprises a small water reservoir 31, a heater 32 and a temperature sensing and controlling unit 33. The small water reservoir 31 has a water inlet 34 and a water outlet 35 connected to the water delivery system 20. The heater 32 can be placed either outside or inside of the small water reservoir 31. The temperature sensing and controlling unit 33 is preferably including a temperature sensor 38 and an adjustable temperature controller 39. The tip of the temperature sensor 38 is preferably close to or touches the inner end of water inlet 34 inside the small water reservoir 31, so that once water delivery system 20 start to deliver water to the small water reservoir 31, the initial temperature of the water can be detected by the temperature sensor 38 to decide if any heat exchanging operation is needed. As a result, the heater 32 can be started right after the water delivery system 20 started to deliver water, which saves time for the overall operation.

The temperature controller 39 can be a part of the main setting and controlling system 70 to predetermine the ideal temperature and it can also control the heater 32 to turn on when water temperature is lower than the predetermined temperature and turn off the heater 32 otherwise, so that the water temperature can be controlled around the predetermined temperature for a period of time. To save energy, the wall of the small water reservoir 31 can be made of heat insulating material or double layer thermos structure. The top of the small water reservoir 31 is preferred to be open-able for maintenance and cleaning purpose. It may also have a small hole for balancing pressure inside and outside the small water reservoir 31.

Figure 3:
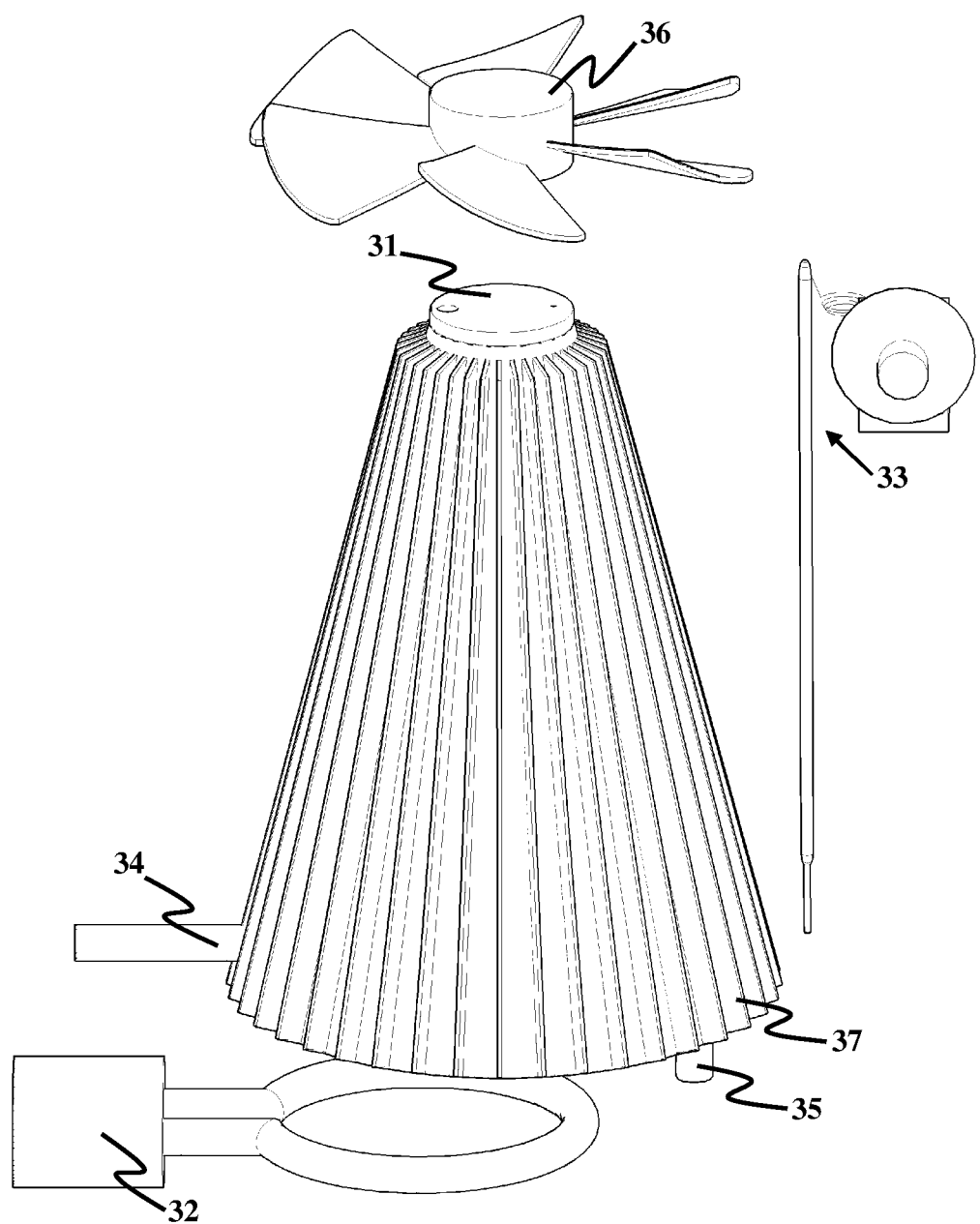
FIG. 3 is an exploded view of a heat-exchanging reservoir with an electrical fan for heating up or cooling down water to a predetermined temperature.

In another embodiment shown in FIG. 3, the heat-exchanging reservoir 30 further comprises an electrical fan 36 and a plurality of cooling fins 37 on the surface of the small water reservoir 31 to form a cooling system. The shape of the small water reservoir 31 also needs to be optimized so that the cooling system can be more efficient to cool down hot water quickly. In FIG. 3, the small water reservoir 31 has a corn shape to increase its surface area and efficiently utilize the air flow created by the electrical fan 36, however, other shapes are also possible for the same purpose. Ventilation holes may also be opened on the housing of the apparatus near the top of the electrical fan 36 and the bottom of the small water reservoir 31 to allow steam and heat to dissipate easily. The top of the small water reservoir 31 is closed, so the electrical fan 36 will not bring particles or dust to contaminate the water in it.

Alternatively, the cooling system may be in the form of a cooling coil inside or outside the small water reservoir 31. Cooling fluid flowing through inside of the cooling coil can be pumped from a compressor cooling system or just be water from a separate reservoir to cool down hot water inside the small water reservoir 31. The system can further include an electrical fan 36 for dissipating heat taken by the cooling fluid. It is also possible to cycle the hot water from the small water reservoir 31 flowing through inside of the cooling coil with an electrical fan 36 blowing cold air on it or with cooling fluid flowing outside of the cooling coil to dissipate heat. Furthermore, the heat-exchanging reservoir 30 can also have a stirring unit to stir the water inside for a more uniform temperature distribution, so that the efficiency of heat-exchanging can be further improved.

Figure 4:
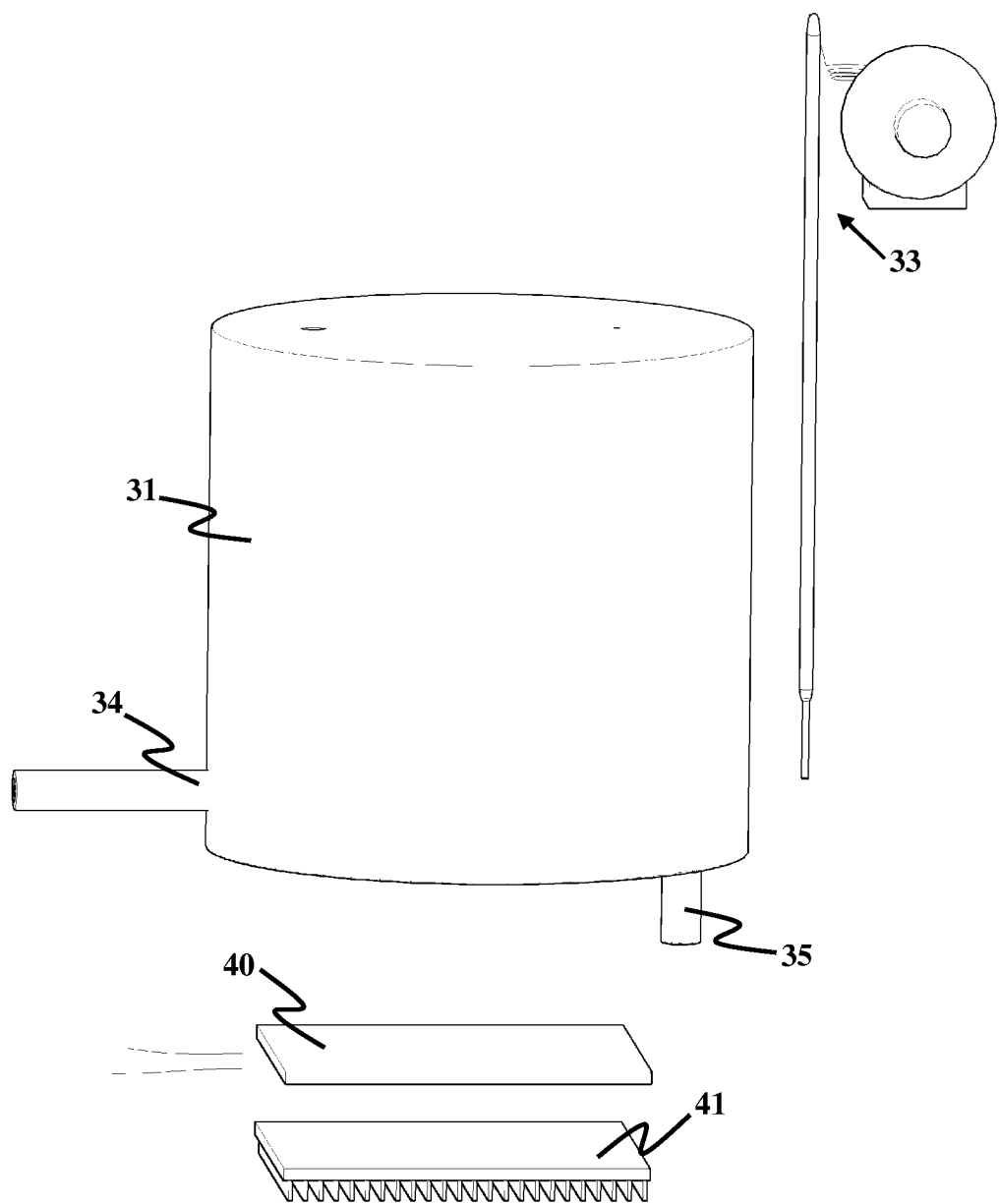
FIG. 4 is an exploded view of a heat-exchanging reservoir with a thermoelectric cooling and heating unit for heating up or cooling down water to a predetermined temperature.

FIG. 4 shows another design of the heat-exchanging reservoir 30 with a thermoelectric cooling and heating unit 40 at the bottom. Depends on the electrical current direction, the thermoelectric cooling and heating unit 40 can used as both a heater and a cooler. In this case, the temperature sensing and controlling unit 33 can adjust the value and direction of the electrical current to control the temperature of the thermoelectric cooling and heating unit 40, and therefore can control the water temperature more quickly and precisely. During cooling operation, the top surface of the thermoelectric cooling and heating unit 40 has a low temperature, while its bottom surface has a high temperature. So a heat dissipating unit 41 is connected to the bottom of the thermoelectric cooling and heating unit 40 so that it will not become too hot to get damaged. During a heating operation, the bottom surface becomes cold and the heat dissipating unit 41 can be used for obtaining heat to prevent the temperature getting too low. Due to the nature of the thermoelectric cooling and heating unit 40 with certain limit of temperature differences between the top and bottom surfaces, the heat dissipating unit 41 can improve its heat-exchanging efficiency by keeping the bottom surface as close to the room temperature as possible. The heat-exchanging reservoir 30 can further comprise a fan to help heat-exchanging. It can also comprise another heater to increase heating speed, for example, placing heater inside of the small water reservoir 31. The thermoelectric cooling and heating unit 40 can also be placed on the sidewall or on top of the small water reservoir 31. In this case, an extra heater or cooler can be placed at the bottom to increase the heating or cooling speed.

With the help of the heat-exchanging reservoir 30, the dispensed water can be adjusted to a predetermine temperature much faster than using a single big water container 10 as disclosed in some prior arts. In the embodiment shown in FIG. 2, the water container 10 is only for storing cold sterilized water. The heat-exchanging reservoir is used for heating up cold water and maintaining warm water. In other embodiments shown in FIGS. 3 and 4, since the heat-exchanging reservoir 30 can also quickly cool down hot water, the water container 10 can be more flexible with heat insulation structure to store hot water or with a electrical heater to boil water. Furthermore, if water in the water container 10 is cold and un-sterilized, the heat-exchanging reservoir 30 can even boil water then cool down the water to warm in a short time. Therefore, the apparatus becomes more convenient and flexible for a user. The water container 10 is ideally detachable from the apparatus for maintenance and cleaning purpose.

Figure 5:
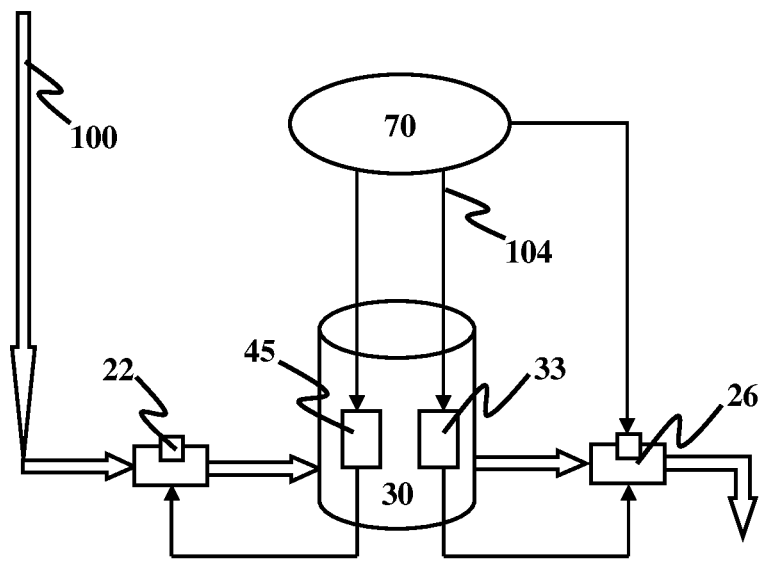
FIGS. 5a and 5b are layout views of different embodiments of water delivery systems and interactions with the heat-exchanging reservoir and the main setting and controlling system.
Figure 5:
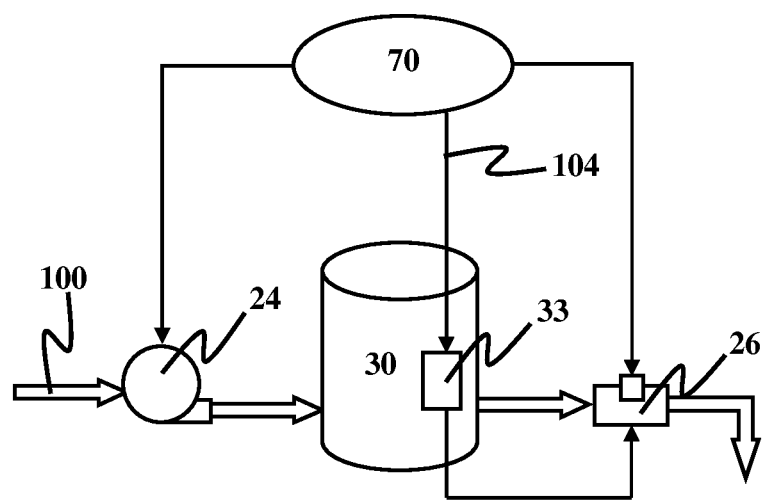

FIG. 5a shows a water delivery system 20 connected to the heat-exchanging reservoir 30 including an inlet water valve 22, an outlet water valve 26 and a water level sensing and controlling unit 45. In this configuration, the water container 10 is preferred to be higher and the milk bottle or cup 80 is preferred lower than the heat-exchanging reservoir 30, so that water can be delivered simply by gravity and capillary forces. The water level sensing and controlling unit 45 is placed inside the heat-exchanging reservoir 30. During the operation, the inlet water valve 22 is opened and the outlet water valve 26 is closed, so that water comes from the water container 10 and passes through the inlet water valve 22 filling into the heat-exchanging reservoir 30. When water volume is reaching predetermined value, the water level sensing and controlling unit 45 will send out a signal to shut off the inlet water valve 22. After water is adjusted to a predetermined temperature, the temperature sensing and controlling unit 33 will send out a signal to the outlet water valve 26. The main setting and controlling system 70 also determines if the outlet water valve 26 should be opened. Only when it receives both signals from the temperature sensing and controlling unit 33 and the main setting and controlling system 70, the outlet water valve 26 can be opened so that the water will be delivered into the milk bottle or cup 80.

If the main setting and controlling system 70 does not send an "open" signal, the outlet water valve 26 will remain closed even if the water has reached the predetermined temperature. In this case, the heat-exchanging reservoir 30 is in a mode of maintaining water temperature controlled by the temperature sensing and controlling unit 33. It can be made as a button or lever controlled by a user to send this signal. When the user is ready and presses the button or lever, the warm water is delivered, otherwise it will stay inside of the heat-exchanging reservoir 30 maintaining warm and waiting for the user. This valve function can also be achieved by series connection of two simpler valves. One is controlled by the temperature sensing and controlling unit 33 and the other is controlled by the main setting and controlling system 70.

In another embodiment shown in FIG. 5b, the inlet water valve 22 is replaced by a water pump 24 and the water level sensing and controlling unit 45 can be eliminated. In this case, the main setting and controlling system 70 controls the water pump 24 to deliver predetermined amount of water into the heat-exchanging reservoir 30 and the water container 10 does not have to be higher than the heat-exchanging reservoir 30. Therefore, the apparatus can have a more compact volume. The outlet water valves 26 in both FIGS. 4a and 4b can also be replaced by water pumps, however, this may increase the cost for the apparatus.

There are many patents and products for powder dispensers 60. Some types can be directly applied in the apparatus of the present invention. Therefore, there will be not much details discussed about this unit in present invention. The powder dispenser 60 can be either manually or electrically driven to dispense predetermined amount of formula or beverage powder in a fast and accurate manner. However, instant formula powder and some other types of instant beverage powder are very sensitive to moisture. The powder dispenser 60 is preferably including a mixing or scraping unit for breaking powder that is agglomerated or sticking to the wall of the container. Also, the powder dispensing system is preferably isolated from the water dispensing system to avoid introducing moisture in to the remaining powder. Furthermore, it will be ideal to have a cap on the powder dispensing nozzle which can be opened during powder dispensing and remain closed otherwise to isolate the powder from air.

The external mixing system 90 is optional in this invention and can be eliminated to decrease the cost for the apparatus. However, it may still be needed in some cases, for example, when mixing process is substantially difficult to be performed manually. The external mixing system 90 is preferably located near the bottom of the apparatus with a shaking or vibration generator or an ultrasonic device. The shaking or vibration is applied to the milk bottle or cup 80 and helps powder to dissolve in water. In the case of using ultrasonic vibration, the bottom of the milk bottle or cup 80 needs to be made of materials that are efficient to conduct the ultrasonic energy into the mixture inside. There are many products and prior arts available for shaking and vibration generators and ultrasonic devices. Therefore, this invention will not cover structural details for that kind of devices. The advantages of using an external mixing system 90 are that the powder dispense system can be easily isolated from the water dispense system to prevent absorption of unwanted moisture and there is no need for extra cleaning and maintenance, since the mixing process happens in the milk bottle or cup 80.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for infant formula and beverage preparation in conjunction with a bottle or cup, comprising:
   a first water container, for storing sterilized water;
   a;
   a second water container;
   a heater and cooler assembly, wherein said heater and cooler assembly is coupled to said second water container so that water gets heating or cooling while staying inside of said second water container;
   a water delivery system, for delivering predetermined amount of water from said first water container into said second water container and from said second water container to said bottle or cup;
   at least one powder container, for storing formula or beverage powder; and
   at least one powder dispenser, for dispensing predetermined amount of powder from said powder container into said bottle or cup;
   such that the infant formula or beverage to be prepared has user predetermined volume, concentration and temperature.

2. The apparatus of claim 1, further comprising a main setting and controlling system which is a combination of all setting and controlling terminals that can be adjusted and controlled by a user, wherein said main setting and controlling system can be integrated into one place as a single controller with multiple parameters or can be located at different places with each place controlling one or more parameters on a housing of said apparatus.

3. The apparatus of claim 1, further comprising an external mixing system, which has at least one device selected from the group consisting of shaking generator, vibration generator and ultrasonic generator, for mixing and dissolving powder with water inside of said bottle or cup.

4. The apparatus of claim 1, further comprising a remote controlling system, so that a user can start the formula or beverage preparation process from a distance.

5. The apparatus of claim 1, wherein said first water container is removably connected to a housing of said apparatus and has an adaptor for connecting to said apparatus to allow water to flow into said second water container.

6. The apparatus of claim 1, further comprising a temperature sensor for controlling water temperature in said second water container.

7. The apparatus of claim 1, wherein said powder dispenser has a mixing or scraping unit for breaking powder that is agglomerated or sticking to the wall of said powder container.

8. The apparatus of claim 1, wherein said powder dispenser is placed at the bottom or inside of said powder container which is removably connected to a housing of said apparatus.

9. The apparatus of claim 1, further comprising a powder dispensing nozzle with a cap which is substantially airtight and can be opened during powder dispensing and remain closed otherwise to prevent the powder from getting moisture from outside.

10. The apparatus of claim 1, wherein said heater and cooler assembly comprises at least one electrical fan and a plurality of fins.

11. The apparatus of claim 1, wherein said heater and cooler assembly comprises at least one pump, at least one cooling coil pipe and at least one device selected from the group consisting of cooling fluid reservoir, compressor cooling system and electrical fan.

12. The apparatus of claim 1, wherein said heater and cooler assembly comprises a thermoelectric heating and cooling unit and a heat dissipater.

13. The apparatus of claim 1, wherein said heater and cooler assembly further comprises at least one electrical fan for improving heat-exchanging efficiency.

14. The apparatus of claim 1, wherein said heater and cooler assembly further comprises at least one stirring unit to further improve heat-exchanging efficiency.

15. The apparatus of claim 1, wherein said water delivery system comprises an inlet water valve which allows water to flow from said first water container to said second water container, a water level sensing and controlling unit placed inside of said second water container to control said water with predetermined amount, and at least one outlet water valve which release said water to said bottle or cup when said water is adjusted to a predetermined temperature and ready to use.

16. The apparatus of claim 1, wherein said water delivery system comprises at least one water pump to deliver predetermined amount of water from said first water container to said second water container and at least one outlet water valve which release said water to said bottle or cup when said water is adjusted to a predetermined temperature and ready to use.

17. An apparatus for infant formula and beverage preparation in conjunction with a bottle or cup, comprising:

a water dispensing system which comprises a first water container, a second water container, a heater, and a water delivery system for delivering predetermined amount of water from said first water container to said second water container and from said second water container to said bottle or cup, wherein said heater is coupled to said second water container so that said predetermined amount of water gets heating while staying inside of said second water container;

a powder dispensing system which comprises at least one powder container for storing formula or beverage powder and at least one powder dispenser for dispensing predetermined amount of powder from said powder container into said bottle or cup;

such that the infant formula or beverage to be prepared has user predetermined volume, concentration and temperature.

\* \* \* \* \*